Oct. 9, 1962 E. E. HANSON 3,057,396
APPARATUS FOR FORMING TIRE BODIES
Filed June 21, 1956 2 Sheets-Sheet 1
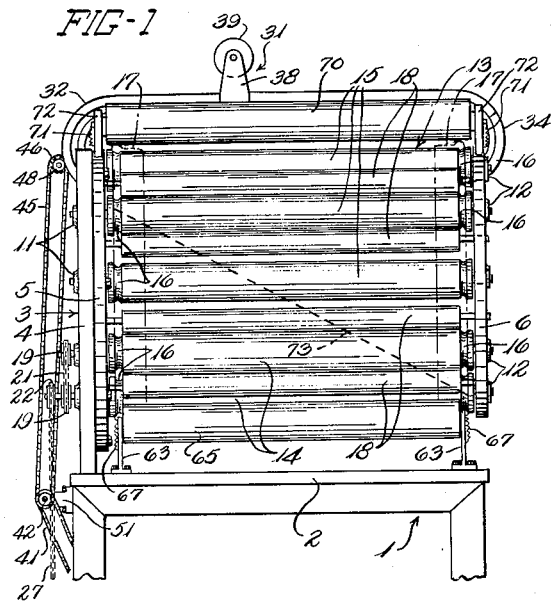
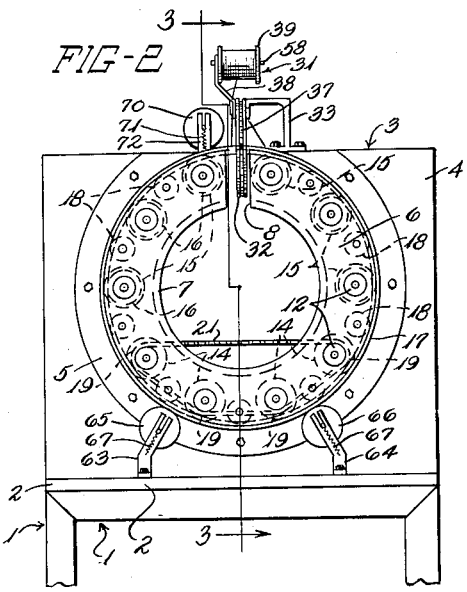
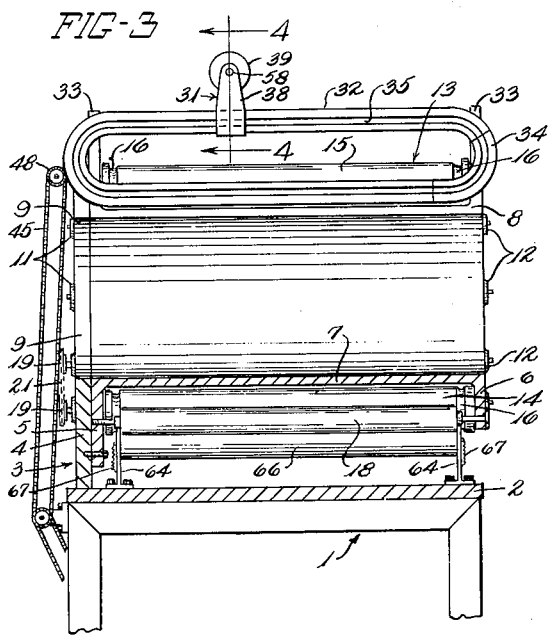
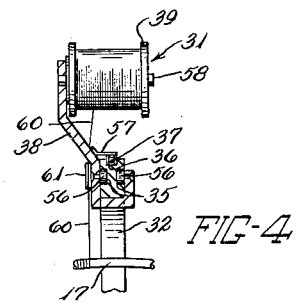
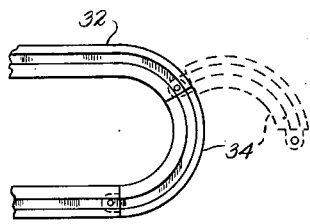
INVENTOR.
ELMO E. HANSON
BY W. A. Fraser
ATTY.

Oct. 9, 1962 E. E. HANSON 3,057,396
APPARATUS FOR FORMING TIRE BODIES
Filed June 21, 1956 2 Sheets-Sheet 2
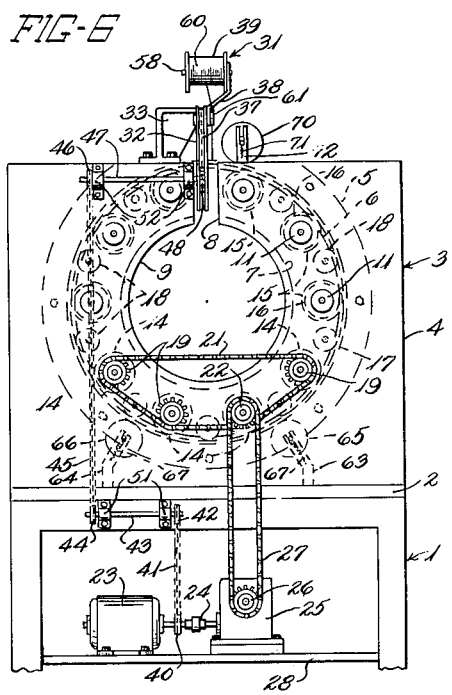
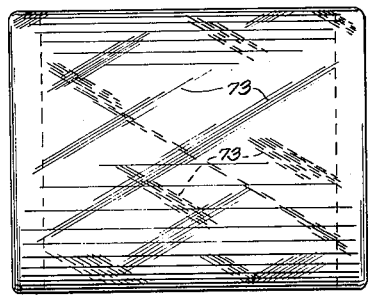
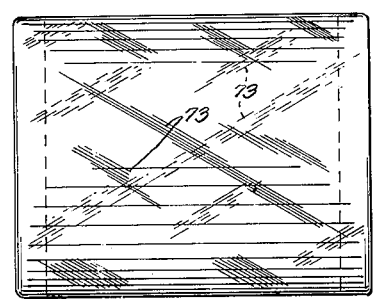
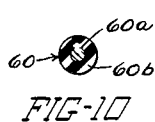
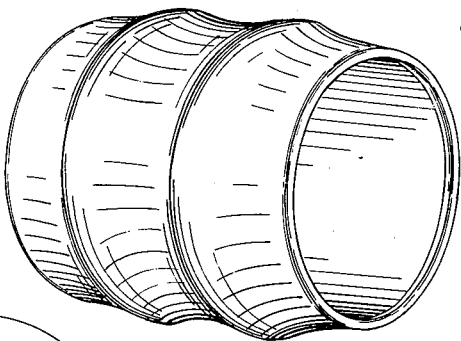
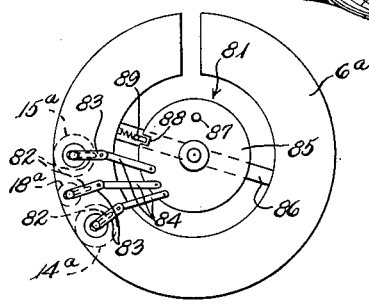
INVENTOR.
ELMO E. HANSON
BY W. A. Fraser
ATTY.

United States Patent Office 3,057,396
Patented Oct. 9, 1962

3,057,396
APPARATUS FOR FORMING TIRE BODIES
Elmo E. Hanson, Akron, Ohio, assignor to The Firestone Tire & Rubber Company, Akron, Ohio, a corporation of Ohio
Filed June 21, 1956, Ser. No. 592,803
1 Claim. (Cl. 156—397)

This invention relates to an improved apparatus for forming tire bodies and, more specifically, for forming tire bodies by winding cord diagonally between a pair of axially spaced annular bead members to form an annular wrapping.

The development of modern high-speed automobiles, coupled with the requirement for ever-smoother ride qualities, has placed severe demands upon the tire industry to produce exceptional and superior products. Tire bodies have been conventionally formed by wrapping a reinforcing fabric between a pair of axially spaced annular bead members and covering the fabric with rubber body stock. The individual strands or cords of the fabric reinforcement are subjected to high stresses throughout the useful life of the tire. Thus, it is essential that no cord ends remain unsecured and loose. Commonly, many thousands of cord ends must be tied down or otherwise secured, which necessitates expensive and time-consuming operations. The turned-down ends and the lap splices of the fabric reinforcement in the tire body are detrimental to the ride qualities of the tire in that they form lumps and preclude uniformity of cord placement.

A continuous annular wrapping has heretofore been formed by rotating a pair of axially spaced annular bead members about their common axis and simultaneously winding cord around the bead members to form a plurality of cord segments extending diagonally across the space between the bead members until a complete annular wrapping is built up on the bead members. The apparatus developed for winding cord around the annular beads in this manner has proved disadvantageous for various reasons. A primary disadvantage of some prior apparatus lies in the fact that cord segments have been laid down diagonally across the space between the bead members in a straight line and do not conform to a cylindrical configuration coincident with the axial projection of the peripheries of the bead members. Consequently, the annular layer of cords which is built up in this manner is concave in axial cross section. Because of the foreshortened cord segments characterizing this configuration, expansion of the annular tire body into the toroidal shape of a finished tire is attended by considerable difficulty. In other prior apparatus, partial support for the cord segments has been achieved by initially positioning and securing a length of fabric between the bead members and wrapping the cords around this fabric. If the fabric is still enough enough or is under sufficient tension, it supports the radially outside layer of cords in a cylindrical configuration; but this method also has been found unsatisfactory because the radially inside cord segments still extend between the beads in a straight line.

Further, certain prior apparatus has embodied supporting structure for the rotating bead members which engages such members on the radially exterior surfaces thereof. Since the bead members commonly consist of relatively flexible and small gauged wire, such exterior support is insufficient to firmly maintain the rotating bead members against undesirable axial and radial distortion during the wrapping operation. To prevent such distortion, it has been necessary to position supporting structural members radially inside the bead members to engage the members on their radially interior surfaces. However, because of the close fit between the tightly wound tire body and the forming apparatus, removal of the wrapped body has been accomplished with great difficulty in prior machines; and the removal problem is made even more difficult by the use of supporting structure radially inside of the bead members.

A primary object of the invention is an improved apparatus and method for winding a continuous cord into a tire body whereby a readily expandable cylindrical wrapping is efficiently and economically produced.

A further object of this invention is an improved apparatus upon which a tire body may be formed by wrapping cord diagonally between a pair of axially spaced annular bead members while the cord wrapping is supported in a substantially cylindrical configuration corresponding to the axial projection of the peripheries of the bead members.

A further object of this invention is an improved tire body forming apparatus upon which an annular wrapping may be formed by winding a cord diagonally between a pair of axially spaced annular bead members and from which the wrapped body may be readily removed.

A still further object of the invention is an improved method of forming a tire body by rotating a pair of axially spaced annular forming members about their common axis, winding cord diagonally therebetween to form an annular wrapping, and supporting the wrapping during the winding operation in a substantially cylindrical configuration.

These and other objects will be more apparent from the drawings and description presented hereinafter.

Broadly stated, the invention includes an apparatus for forming a tire body which comprises means for rotating a pair of axially spaced generally annular bead members about their common axis, means in timed relationship with said rotating means for winding cord around the bead members to form a plurality of cord segments extending diagonally across the space between the bead members, and means providing a substantially continuous cylindrical surface coaxial with and generally corresponding in diameter to the bead members to support the cord segments between the bead members. The apparatus of the invention produces a wrapped tire body which is cylindrical in configuration and easily expandable into a toroidal tire shape. In addition, the apparatus is so constructed that the completed tire body is easily removed therefrom.

Further, the invention includes a method of forming a tire body comprising rotating a pair of axially spaced annular forming members about their common axis, winding cord around the rotating members to form an annular wrapping having cord segments thereof extending diagonally across the space between the members and supporting substantially the entire radially interior surface of said wrapping during the winding operation to maintain said wrapping in a cylindrical configuration conforming to the axial projection of the peripheries of said members.

A specific embodiment of the invention is completely described hereinafter and is shown on the drawings in which:

FIGURE 1 is a view in front elevation showing the apparatus of the invention with a tire bead in position preparatory to beginning the cord-winding operation;

FIGURE 2 is a view in right side elevation showing the apparatus of the invention;

FIGURE 3 is a vertical sectional view taken in the direction of the arrows along line 3—3 of FIGURE 2;

FIGURE 4 is a vertical sectional view to an enlarged scale taken in the direction of the arrows along line 4—4 of FIGURE 3 and showing a portion of the cord-winding mechanism of the invention;

FIGURE 5 is a fragmentary view showing the right end portion of the oval raceway of the apparatus shown in FIGURE 3 and illustrating somewhat diagrammatically a gate through which tire beads may be inserted into the raceway and the wrapped tire body may be removed therefrom after the cord-winding operation of the invention;

FIGURE 6 is a view in left side elevation showing the apparatus of the invention;

FIGURES 7 and 8 are views of a tire body formed by the cord-winding operation of the invention;

FIGURE 9 is a view of a tire body formed by the cord-winding operation of the invention and having tread and side body stock formed thereon;

FIGURE 10 is a view showing in cross-section a single strand rubber-coated cord used in forming a tire body wrapping in accordance with the invention;

FIGURE 11 is a fragmentary view showing in cross-section a preferred embodiment of a two-ply tire body wrapping formed in accordance with the invention;

FIGURE 12 is a view in cross-section of a rubber-coated multiple cord strip alternatively used in forming a tire body wrapping in accordance with the invention; and FIGURE 13 is a fragmentary view showing a modified form of the invention embodying a roller-collapsing mechanism.

As shown in the drawings, there is provided a supporting table designated generally by the reference numeral 1. It will be understood that the table 1 is formed of a plurality of framing and bracing members which are shown only to the extent necessary for a complete understanding of the invention. Mounted upon the table 1 and secured thereto as by welding is a base plate 2. There is also provided a support assembly 3 which comprises an upstanding plate member 4, annular bearing plates 5 and 6, and a slotted cylindrical connecting member 7. Bearing plates 5 and 6 and connecting member 7 are preferably welded together, but it will be understood that they may be fabricated in a single integral assembly. These members are supported by plate member 4 and preferably secured thereto by bolts extending through bearing plate 5. Plate member 4 is welded or otherwise secured to base plate 2. Thus, the support assembly 3 is supported on one end only. A slot 8 is formed by openings at the top of upstanding plate member 4, bearing plates 5 and 6, and connecting member 7. Further, plate member 4 has formed therein a circular hole 9 coaxial with and equal in diameter to the inside diameters of annular bearing plates 5 and 6 and connecting member 7. There is also provided an annular roller assembly 13 consisting of four large drive rollers 14, six large idler rollers 15, and nine small idler rollers 18 situated one between each of the large rollers 14 and 15. It is important that no part of bearing plate 6 extend transversely of the axis of the roller assembly 13 further than the peripheral surface thereof. Each of the rollers 14 and 15 is journaled in bearings 11 extending through plate member 4 and bearing plate 5, and bearings 12 in bearing plate 6. The small idler rollers 18 are journaled between bearings in bearing plates 5 and 6. Each of the rollers 14 and 15 has a pair of shallow annular grooves 16 situated one at each end of each roller. If desired, the grooves 16 may be lined with a resilient material preferably having a low adhesion to uncured rubber. A preferred lining material is Teflon. The purpose of the grooves 16 is to receive a pair of flexible annular tire bead members 17 having a normal diameter substantially equal to the diameter of the circle extending around the grooves 16 of roller assembly 13. The length of the bead members 17 will thus be slightly less than the circumference of the outside surface of the roller assembly; but they may be passed over the rollers into the grooves by the flexible bead being drawn into the path of the chords between the rollers. When the beads are seated in the grooves, they return to their true circular configuration. If desired, the bead members may be covered with a double ply of conventional cross-woven bead reinforcing fabric.

It will be understood that, if it is desired to use bead members 17 of a substantially non-flexible type, means for reducing the diameter of annular roller assembly 13 may be provided in any manner found desirable as for example, but without limitation, the roller-collapsing mechanism 81 illustrated in FIGURE 13. The bearings in which each of the rollers 14a, 15a and 18a are journaled are slideably mounted in slots 82 in the end plate 6a. Further, each of the bearings has rigidly secured thereto one end of a toggle link 83 to the opposite end of which is pivotally attached one end of a second toggle link 84 which in turn has its opposite end pivotally secured to operating wheel 85 near the periphery thereof. The operating wheel 85 is in turn pivotally mounted on bracket 86 fixed as by welding to the end plate 6a. The operating wheel 85 is also provided with a handle 87 and a peripheral notch 88 to receive a spring-biased sliding detent 89 to lock the operating wheel 85 when the rollers are in their fully extended positions. In operation, the detent 89 is manually loosened and the operating wheel 85 is rotated counter-clockwise by the handle 87. By virtue of the toggle linkage, each of the rollers is moved radially inwardly to facilitate the mounting of the bead members 17. After the bead members are positioned in the grooves 16, the rollers are again moved to the extended position and locked. In the same manner, the rollers may be collapsed to facilitate removal of the finished tire body. While, for the sake of simplicity, the roller-collapsing mechanism is shown as applied to only three rollers, it will be understood that as many of the rollers in the annular array as desired may be provided with the necessary connections to permit collapse of the entire array or any portion thereof. Further, it will be understood that a similar roller-collapsing mechanism is provided on the opposite end of the roller assembly with an operating wheel similar to operating wheel 85 and connected thereto by an axle to permit common actuation.

In order that the bead members 17 may be rotated about the axis of the roller assembly 13, each drive roller 14 has rigidly connected to one end thereof a sprocket 19. Extending around all of the sprockets 19 in driving relation is a chain 21. Rigidly connected coaxially with the sprocket 19 on one of the drive rollers is a second sprocket 22 operatively connected to a motor 23, preferably electric, through shaft 24, gear reduction box 25, sprocket 26, and chain 27. Thus, upon operation of motor 23 motion will be imparted to sprocket 22 and in turn to drive rollers 14 which will impart rotation to bead members 17 circumferentially around roller assembly 13. Means are provided to vary the gear ratio in the gear reduction box 25 in order that the speed of sprocket 22 may be varied for a given speed of motor 23. In addition, means are provided to reverse the direction of rotation through the gear reduction box 25. Further, means are provided for varying the speed of motor 23 in order that there might be flexibility of output speed adjustment. Motor 23 and gear reduction box 25 are bolted to mounting plate 28, which is preferably welded to table 1.

In order to wrap cord continuously around the rotating bead members in an orbital path interlinked therewith, there is provided a generally oval raceway 32 which is rigidly welded by means of brackets 33 to bearing plates 5 and 6. The raceway 32 is centered in slot 8 with its longitudinal axis approximately coincident with the axial projection of the peripheries of the bead members 17. The raceway 32 is shown rigidly mounted parallel to the axis of the roller assembly 13. However, for a purpose set forth hereinafter, the raceway 32 may be pivotally mounted to permit the horizontal angle between the raceway and such axis to be adjusted. A gate 34 of raceway 32 is hinged as diagrammatically shown in FIGURE 5. Thus, the gate 34 may be opened to permit the mounting of the bead members 17 and the removal of the wrapped tire body. A cord-winding mechanism designated generally by the reference numeral 31 is slideably mounted on raceway 32 for rotational movement therearound and includes link chain 37, slide bracket 38, and spool 39. Raceway 32, as shown in FIGURE 4, is provided with side grooves 35 and exterior groove 36 extending throughout the length of the raceway. Chain 37 is situated in groove 36 and extends completely around raceway 32. Slide bracket 38 is provided with studs 56 which slideably engage side grooves 35 of raceway 32. If desired, small rollers may be substituted for the studs 56. Slide bracket 38 is also provided with an extending arm 57 which is rigidly connected as by welding to chain 37. Also secured to slide bracket 38 is stub shaft 58 adapted to rotatably support spool 39 which contains a substantial length of cord 60. The end of cord 60 extends through a pulley 61 on the side of slide bracket 38 and is attached to one of the bead members 17 to be wound therearound. Rotational movement around raceway 32 may be imparted to the winding mechanism 31 by motor 23 through shaft 24, sprocket 40, chain 41, sprocket 42, shaft 43, sprocket 44, chain 45, sprocket 46, shaft 47, and sprocket 48 which operatively engages chain 37. Shaft 43 is journaled in bearings 51, bolted to the side of table 1. Shaft 47 is journaled in bearings 52, bolted to the side of plate member 4. A short section of chain 37 is easily removable to permit the bead members to be mounted and the wrapped tire body to be removed.

Rotation is generally continued in one direction until a complete annular wrapping is built up with a single ply of cord on the radially exterior surface and another single ply on the radially interior surface of the bead members. Each cord segment will extend diagonally across the cylindrical space between the bead members and the exterior segments will cross the interior segments which greatly increases the reinforcement value of the cord wrapping.

The bias angle or the angle between each cord segment and the direction of rotation of bead members 17 should be sufficiently great so that each cord segment 73 will cross a substantial number of cord segments in the adjacent ply. As shown in FIGURE 1, each cord segment 73 will cross and be supported by several rollers as it extends across the space between the bead members 17. The bias angle may be adjusted by changing the horizontal angle between the raceway 32 and the axis of the roller assembly 13. Preferably, however, the bias angle is varied by adjusting the relative rates of movement of the cord-winding mechanism 31 and the bead members 17. This relative adjustment may be obtained by changing the gear ratio of the gear reduction box 25 or by employing variously sized drive sprockets. Ideally, these relative rates will be such that, in addition to obtaining a satisfactory bias angle, after one revolution of the bead members, the cord-winding mechanism will return to a point on the bead members which is located at a distance equal to the width of a single strand of cord past the point at which the revolution began. If desired, indexing means may be employed to assure the proper relative adjustment. However, it has been found that, even though reasonable variations are permitted from such ideal relative rates of rotation, the spacing between adjacent cord segments will be equal and continued winding operations will result in the laying down of a satisfactorily complete and uniform wrapping of cord. For example, a bias angle of approximately 28.5° is preferred for a standard 6.70/15 tire. This bias angle may be achieved by using a ratio of about five complete circuits of the cord-winding mechanism 31 to about two revolutions of the bead members 17.

It is to be understood that improved uniformity of winding may be obtained by inducing, by any well-known expedient, an increased speed of travel of chain 37 through the periods when the cord-winding mechanism 31 is passing the ends of raceway 32 and the direction of winding about the bead members 17 is being reversed. Further, if desired, the spool 39 may be provided with any well-known tensioning device to resist the formation of slack and take up any slack which might be formed in the cord during the winding operation. Further, in order that the formation of slack in the cord will be obviated during the period when the cord-winding mechanism is passing the ends of the raceway 32, it is preferable that the centers of curvature of the end portions of the raceway 32 lie between the grooves 16 and thus between the bead members 17.

It will be understood that a different number of rollers may be used in the roller assembly 13 than is herein disclosed. However, as many rollers as possible should be used in order that the peripheral configuration of the roller assembly 13 will provide a substantially continuous cylindrical surface coaxial with and approximately equal in diameter to the bead members 17. Thus, the cord wrapping and each cord segment 73 thereof is supported by the roller assembly 13 in a substantially cylindrical configuration conforming to the projection of the peripheries of the bead members axially across the space between the bead members. Each segment 73 is thus prevented from extending across this space in a straight line which would be its normal unsupported path. Stated differently, the entire wrapping and each cord segment 73 thereof is supported in substantial coincidence with the projected cylindrical surface extending axially between the bead members. It is clear that the sole purpose of that portion of the roller assembly 13 which lies between the grooves 16 is to provide support for the cylindrical wrapping while it is being formed. It will be understood that the bead members 17 might be supported and driven by some other suitable mechanism such as a plurality of small pulleys or narrow grooved rollers only slightly greater in width than the cross-sectional diameter of the bead members 17, and arranged in cylindrical array equal in diameter with the bead members. These pulleys would be entirely separate from the roller assembly and situated at each end thereof. The rollers constituting the roller assembly would be somewhat shorter in length than the distance between the pulleys. These foreshortened rollers would be rotatably supported but need not be positively driven. Further, the foreshortened roller assembly might be replaced by an equal length of a hollow cylindrical member coaxial with and approximately equal in diameter to the bead members and supported therebetween. This member would be slotted at the top to provide a space for raceway 32. It would support in sliding relationship the cord segments 73 in a cylindrical configuration coincident with the axial projection of the peripheries of the bead members 17.

Mounted by means of brackets 63 and 64 to base plate 2 are a pair of presser rollers 65 and 66 which are biased against bead members 17 by means of tension springs 67 extending between and connected to each presser roller and the outer end of its mounting bracket. An additional presser roller 70 is urged against beads 17 by means of tension springs 71 which are mounted between and connected to the ends of the roller and its mounting brackets 72 attached to bearing plates 5 and 6.

Preferably, the cord 60 which is to be used in the tire body comprises a single strand 60a with a coating 60b of raw rubber body stock as illustrated in FIGURE 10. The coating may be accomplished by a conventional extrusion process wherein the cord is passed through an extrusion die to receive the raw rubber coating. To prevent the cord turns on the spool 39 from adhering together, the raw rubber coating may be lightly covered with an anti-sticking agent such as zinc stearate. It is necessary, however, that the cords adhere to one another in the completed tire body. This adherence may be achieved by compression of the wrapped plies of rubber-covered cord. The presser rollers 65, 66 and 70 which are spring biased against the roller assembly 13 are utilized to provide this compression. Complete union of all of the rubber is achieved in the curing operation. The finished tire body constitutes a solid mass of cord reinforced rubber.

Also if it is desired to increase the speed of production, several cords instead of a single cord may be laid down simultaneously to form the cord wrapping. These cords may be individually coated with raw rubber and fed from multiple spools. Alternatively, a strip 75 of raw rubber with a plurality of strands 76 embedded therein as shown in FIGURE 12 may be used and fed from a single spool. A large number of strands of cord may be embedded in a wide strip of rubber by a conventional calendering operation. The strip 75 may then be severed from such wide strip in the width desired.

Further, if desired, a band of fabric may be laid between and attached to the bead members 17, and the cord 60 may then be built up around the fabric. The cord segments on the radially interior surface of the fabric band will be supported against the band during the wrapping operation by the roller assembly 13.

With reference to FIGURE 11, if it is desired to decrease the cord/rubber ratio in the wrapped tire body, an annular layer 77 of raw rubber body stock may be positioned between the peripheries of the bead members and a wrapping of cord 60 may be wound therearound in the same manner set forth hereinbefore. Then additional layers 78 and 79 of such body stock may be applied on the radially interior and exterior surfaces of the cord wrapping. The layer 78 may be fed between the rollers and the innermost ply of cord wrapping while the bead members 17 are being rotated. The layer 79 may simply be wrapped around the cord wrapping and adhered thereto by pressure from the presser rollers. A two-ply wrapping formed in this manner is shown in FIGURE 11. Two additional plies may be laid down by repeating the winding operation and preferably reversing the bias angle in the manner set forth hereinafter to form another wrapping of cord and applying layers of rubber similar to layers 78 and 79 on the radially interior and exterior surfaces of the second wrapping in the same manner set forth above. As many plies as desired may be laid down by repeating the steps in the same manner. This method of wrapping is particularly advantageous in that the cord/rubber ratio may be maintained at a satisfactory level without decreasing the number of cords per linear inch of wrapping. Of course, the cord/rubber ratio may be decreased by increasing the thickness of the rubber coating 60b of the cord 60, but this might critically limit the number of cords per inch which might be laid down in the wrapping, thus impairing the strength of the cord reinforcement. Any suitable thickness of the cord strand 60a, coating 60b and layers 77, 78 and 79 may be employed as desired. Excellent results have been achieved utilizing thicknesses of 39 mils for the cord strands 60a, 3 mils for the cord coatings 60b and 10 mils for the layers 77, 78 and 79. A maximum number of cords per inch may be laid down by utilizing bare uncoated cords between the layers 79, 77 and 78. Usually, however, a rubber-coated cord is preferred. It is also feasible to eliminate the center layer 77 and apply only the layers 78 and 79 to form a coating of rubber on the radially interior and exterior surfaces of the cord wrapping.

The operation of the apparatus will be apparent from the foregoing description but may be summarized as follows:

Gate 34 of raceway 32 is opened and a short section of chain 37 removed to permit a pair of bead members 17 to be slipped over roller assembly 13 and mounted in grooves 16. Gate 34 is then closed and the chain section replaced. Upon actuation of motor 23, the bead members 17 are rotated circumferentially around the roller assembly 13. Motor 23 also imparts rotation to winding mechanism 31 which, by virtue of its sliding connection to raceway 32, moves transversely around bead members 17 in an orbital path interlinked with the latter. The rubber-covered cord 60, having been attached to one of the bead members 17, is wrapped around the bead members. By virtue of the proper timed relationship between the movement of winding mechanism 31 and the rotation of beads 17, each cord segment 73 extends across the space between the bead members diagonally at a predetermined angle. The winding operation is continued until a complete double-ply wrapping of cord is built up around the entire circumference of the bead members. Because of the continuity of the cord wrapping and the absence of seams, overlaps and the like, an extremely strong and uniform reinforcement is provided.

If additional plies are desired, it is generally advantageous to reverse the bias angle of each ply. This is achieved by reversing the direction of rotation of either the cord-winding mechanism 31 or the bead members 17 while maintaining the rotation of the other in the original direction. Thus, the cord segments in each ply will extend across the space between the bead members 17 in crossing relationship with the immediately adjacent plies on each side.

In constructing a four-ply tire body, plies 2 and 3 will be first wound around the bead members in crossing relationship as shown in FIGURE 6. Plies 1 and 4 will then be wound around the bead members also in crossing relationship to each other as shown in FIGURE 7. Further, plies 1 and 2 will cross each other as will plies 3 and 4.

If desired, however, the first two plies may be wound with their cord segments parallel by reversing the direction of either the cord-winding mechanism or the bead members at the end of each traverse of the cord from one bead member to the other. Then the next two plies may be wound in the same manner except that their individual cord segments would cross the segments of the first two layers.

Whatever procedure is used, as many double plies of cord as desired may be built up around the bead members. Upon completion of the desired number of plies, gate 34 of raceway 32 is opened and a short section of chain 37 is removed to permit the wrapped tire body to be removed from roller assembly 13. Since no part of bearing plate 6 lies outside of the circumference of roller assembly 13, and the sole support of the support assembly 3 is on the opposite end of the roller assembly 13 from bearing plate 6, no obstacle is presented to the removal of the completed tire body by sliding it off of the end of roller assembly 13. At the same time, the support assembly 3 and roller assembly 13 provide a radially unyielding support engaging the radially interior surfaces of the bear members. Thus, the bead members are secured against distortion while being rotated.

Additional rubber is then built up on the tread and side body areas of the tire body as shown in FIGURE 9. The tire body is then expanded to the conventional toroidal tire shape by any well-known means and cured.

There has been illustrated and described what is considered to be the preferred embodiment of the invention. It will be understood, however, that various modifications may be made without departing from the broader scope of the invention as embraced by the following claim.

I claim:

Apparatus for forming a circumferentially continuous, cylindrical tire body terminating axially in beads, comprising means rotating a pair of spaced, unconnected, annular, co-axial beads in a circular configuration, means for laying a continuous cylindrical generally axially extending wrap about said beads while maintaining said beads in said circular configuration, said wrap enclosing said beads and contacting their radially inner and outer surfaces, respectively, an annular array of circumferentially closely spaced means extending axially from bead to bead and supporting the radially inner face of said wrap, said means for laying a wrap including a generally oval raceway extending transversely of said annular array, said raceway including said beads, a spool of wrapping material driven in said raceway, and flexible endless means in said raceway carrying said spool.

References Cited in the file of this patent

UNITED STATES PATENTS

| | | |
|---|---|---|
| 1,162,479 | Harris | Nov. 30, 1915 |
| 1,296,762 | Carlisle | Mar. 11, 1919 |
| 1,370,100 | Dykes | Mar. 7, 1921 |
| 1,442,653 | De Mattia | Jan. 16, 1923 |
| 1,595,404 | Ingham | Aug. 10, 1926 |
| 1,604,985 | Frood | Nov. 2, 1926 |
| 1,609,620 | Gammeter | Dec. 7, 1926 |
| 2,035,821 | Mazeron | Mar. 31, 1936 |
| 2,343,954 | Carlin | Mar. 14, 1944 |
| 2,605,196 | Bostwick | July 29, 1952 |
| 2,650,642 | Reheiser | Sept. 1, 1953 |

FOREIGN PATENTS

| | | |
|---|---|---|
| 203,306 | Great Britain | Sept. 4, 1924 |
| 376,400 | Great Britain | July 14, 1932 |